R. S. RICHESON.
GYROMOTOR WHEEL CONTROLLER.
APPLICATION FILED NOV. 13, 1911.
1,062,797.
Patented May 27, 1913.
2 SHEETS—SHEET 1.
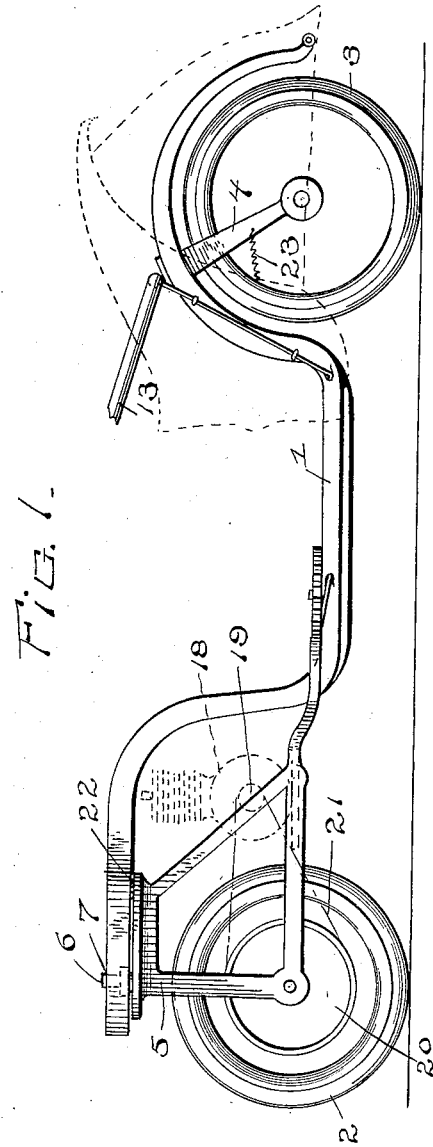
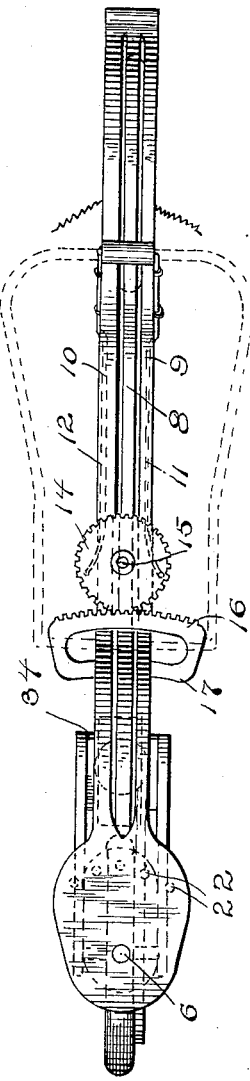
WITNESSES
R. S. Trogner.
H. F. Rueth
INVENTOR
Richard S. Richeson
By John A. Saul
his Attorney R. S. RICHESON.
GYROMOTOR WHEEL CONTROLLER.
APPLICATION FILED NOV. 13, 1911.
1,062,797.
Patented May 27, 1913.
2 SHEETS—SHEET 2.
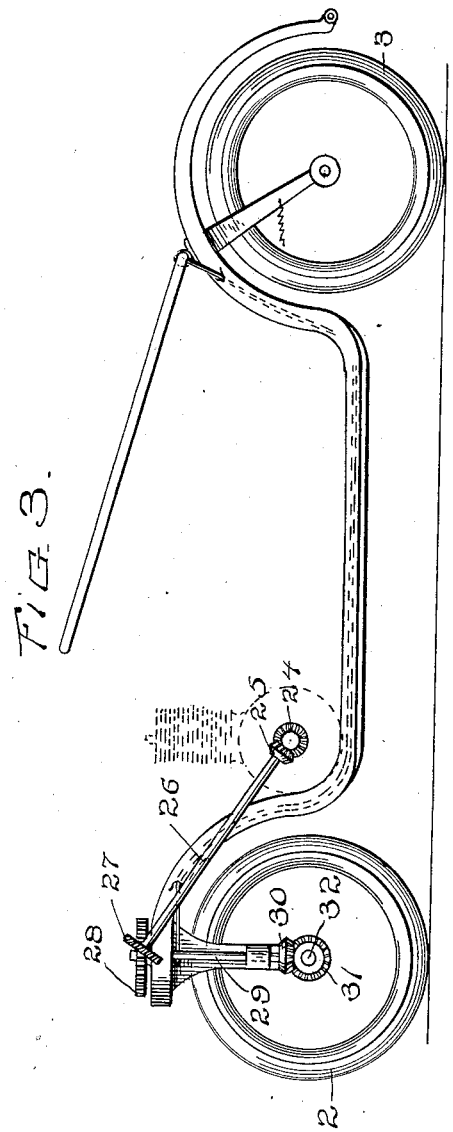
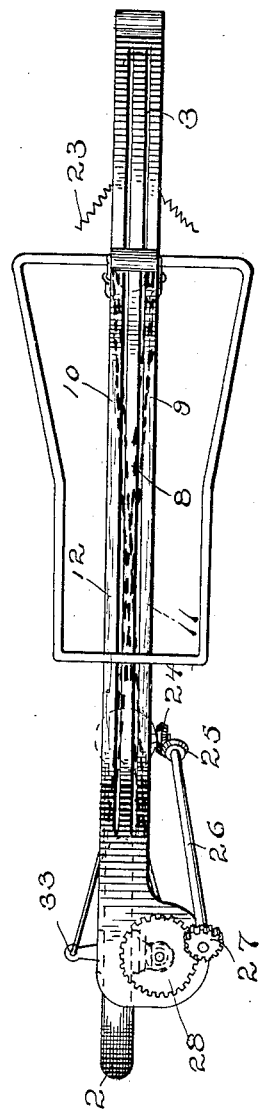
WITNESSES
INVENTOR
Richard S. Richeson
By John A. Saul
his Attorney

UNITED STATES PATENT OFFICE.

RICHARD S. RICHESON, OF ST. LOUIS, MISSOURI.

GYROMOTOR-WHEEL CONTROLLER.

1,062,797. Specification of Letters Patent. Patented May 27, 1913.

Application filed November 13, 1911. Serial No. 660,019.

*To all whom it may concern:*

Be it known that I, RICHARD S. RICHESON, a citizen of the United States, residing at St. Louis, in the State of Missouri, have invented certain new and useful Improvements in Gyromotor-Wheel Controllers, of which the following is a specification.

This invention relates to gyromotors, and particularly to that part of a gyromotor which may be called the wheel controller.

The object of the gyromotor wheel controller is to facilitate the balancing action of the wheels in connection with handle-bar operation. This is accomplished by connecting the front and rear wheels in such a way that, when by the handle-bar movement the driver directs the front wheel one way he simultaneously, through intervening mechanism, directs the rear wheel in the opposite direction. Hence while this also facilitates steering around corners and the like, that is quite incidental.

The primary object of the gyromotor wheel controller is to make the two wheels upon which the car travels so responsive to the driver's touch through the handle-bars that the operation necessary to maintain the balance of the car while going is both shortened and quickened. Now in order to get freedom of action in the rear wheel the engine is mounted upon a table so constructed that the entire engine moves from side to side as the wheel is directed. In the modification, a power transmission is shown whereby the power from the engine is transmitted in such a way as to allow the free operation of the rear wheel while power is being applied to it from the engine mounted stationary upon the frame of the car.

In the drawings forming a part of this specification, and in which like symbols of reference represent corresponding parts in the several views:—Figure 1 is a longitudinal side view of the frame of a machine with my device connected to the same; Fig. 2 is a plan view of the machine; Fig. 3 a side view of a modification; and, Fig. 4 a plan view of the modification.

1 represents the central rib of the machine; 2 and 3 the rear and front wheels of the same; and 4 the front fork.

5 is a frame pivotally connected to the rear of the main rib by a pintle 6, which is journaled in a bearing 7 formed in said rib. The central rib 1 is composed of a central piece 8 and side pieces 9 and 10, said side pieces having bores in the same through which pass cables 11 and 12 extending from the handle-bar 13, and adapted to be operated by the manipulation of the same.

14 is a pinion journaled on a pintle 15 on the bar 8, and having connection with the cables 11 and 12 so as to be rotated by them when the handle-bar is operated.

16 is a rack in which the pinion 14 operates, said rack being formed on a yoke 17 embracing the main rib 1, and preferably formed integral with the frame 5, which carries the rear wheel.

18 is an engine and 19 the shaft of the same, said engine being supported on a table 34, carried by the frame 5.

20 is a belt carriage connected to the rear wheel, and 21 a belt connecting said wheel with a shaft 19 to propel the machine.

22 are bearing rollers to facilitate operation of the rear frame 5.

23 are springs connecting both sides of the fork 4 to the respective corners of the front of the car to hold the front wheel normally straight, as illustrated in Fig. 1, the frame being shown in dotted lines.

The operation of the device will be apparent from the foregoing. When the rider desires to turn the machine from a straight line he operates the handle-bar, which turns it to the right or left, communicating motion through the cables to the pinion 14 which in turn operates the rack and with it the rear wheel. If the machine be turned to the right the rear wheel is directed proportionately to the left, and vice versa.

In the modification shown, a gear 24 meshes with a gear 25 on a shaft 26 carrying a skew gear 27, meshing with a similar gear 28 on a shaft 29; and 33 are arms on the fork connected to the cables 11 and 12. The central and side pieces of the main rib have, in the modification, bores through the same, as shown, to permit the cables to cross each other and obtain the same movement as in the preferred form of my device. Shaft 29 has at its lower extremity a bevel gear 30, meshing with a gear 31 on the rear axle 32 of the machine. The operation is the same as that of the previously described mechanism, and is operated from the handle-bar in the same way.

Having now fully described my invention, what I claim as new, and desire to secure by Letters Patent, is:—

1. A gyromotor wheel controller, consisting of a main rib formed with longitudinal bores, forks journaled in the rib, cables working in the bores of the rib, and means connecting the cables and forks to enable the wheels to be operated in unison.

2. In a gyromotor wheel controller, the combination with the wheels of the machine, of forks carrying said wheels, rotating journals for said forks, cables connecting the wheels to cause them to operate in conjunction and means for normally keeping the wheels straight.

3. A gyromotor wheel controller, consisting of a main rib, forks journaled in the same, the rear fork having a forwardly projecting yoke embracing the rib, a rack on said yoke, a pinion journaled on the main rib and meshing with said rack, and cables connecting the front fork with the pinion to operate the wheels in unison.

In testimony whereof I affix my signature in presence of two witnesses.

RICHARD S. RICHESON.

Witnesses:
CAROLYN DE VELLING,
J. WM. REILY.

Copies of this patent may be obtained for five cents each, by addressing the "Commissioner of Patents, Washington, D. C."